(12) United States Patent
Wakihara

(10) Patent No.: US 8,041,407 B2
(45) Date of Patent: Oct. 18, 2011

(54) SLIDING MECHANISM, ELECTRONIC APPARATUS AND PORTABLE DEVICE

(75) Inventor: Junji Wakihara, Kato (JP)

(73) Assignee: Fujitsu Limited, Kawasaki (JP)

( * ) Notice: Subject to any disclaimer, the term of this patent is extended or adjusted under 35 U.S.C. 154(b) by 531 days.

(21) Appl. No.: 12/112,560

(22) Filed: Apr. 30, 2008

(65) Prior Publication Data

US 2009/0027836 A1  Jan. 29, 2009

(30) Foreign Application Priority Data

Jul. 27, 2007 (JP) ................................ 2007-196403

(51) Int. Cl.
*H04M 1/00* (2006.01)
(52) U.S. Cl. .................... 455/575.4; 455/575.1; 361/814
(58) Field of Classification Search ............... 455/575.4, 455/575.1; 361/814
See application file for complete search history.

(56) References Cited

U.S. PATENT DOCUMENTS

| 2005/0078817 | A1 | 4/2005 | Lee | |
|---|---|---|---|---|
| 2005/0215298 | A1 | 9/2005 | Lee | |
| 2006/0142073 | A1* | 6/2006 | Gordecki | 455/575.4 |
| 2006/0205450 | A1 | 9/2006 | Amano et al. | |
| 2007/0072659 | A1 | 3/2007 | Ryu | |
| 2008/0146297 | A1* | 6/2008 | Ho | 455/575.4 |

FOREIGN PATENT DOCUMENTS

| CN | 2788467 Y | 6/2006 |
|---|---|---|
| JP | 2005-124116 A | 5/2005 |
| JP | 2005-286994 A | 10/2005 |
| JP | 2006-121221 A | 5/2006 |
| JP | 2006-246353 A | 9/2006 |
| JP | 2006-270804 A | 10/2006 |
| JP | 2007-095068 A | 4/2007 |
| KR | 10-0655114 A | 9/2005 |

OTHER PUBLICATIONS

Korean Office Action dated Mar. 11, 2010, issued in corresponding Korean Patent Application No. 10-2008-0037261.
Chinese Office Action dated Mar. 16, 2011, issued in corresponding Chinese Patent Application No. 200810109317.3.
Japanese Office Action dated Jun. 7, 2011, issued in corresponding Japanese Patent Application No. 2007-196403.

* cited by examiner

*Primary Examiner* — Lewis West
(74) *Attorney, Agent, or Firm* — Westerman, Hattori, Daniels & Adrian, LLP

(57) ABSTRACT

A sliding mechanism used for an apparatus such as a portable device suppresses shaking between housing units in an opened state, closed state or on the way to opening/closing. A slide module is provided for opposed surfaces against a first housing unit (upper housing unit) and second housing unit (lower housing unit) to be slid. The slide module slidably supports the first and second housing units. Since the slide module has a slider and a fixing part that slidably supports the slider, it is structured that in case the first and second housing units are in an opened state, the slider is not exposed through the first and second housing units. Structure is included that compared with the first and second housing units in a closed state, in case in the opened state, a guide of the slider for the fixing part of the slide module is made wider.

18 Claims, 12 Drawing Sheets

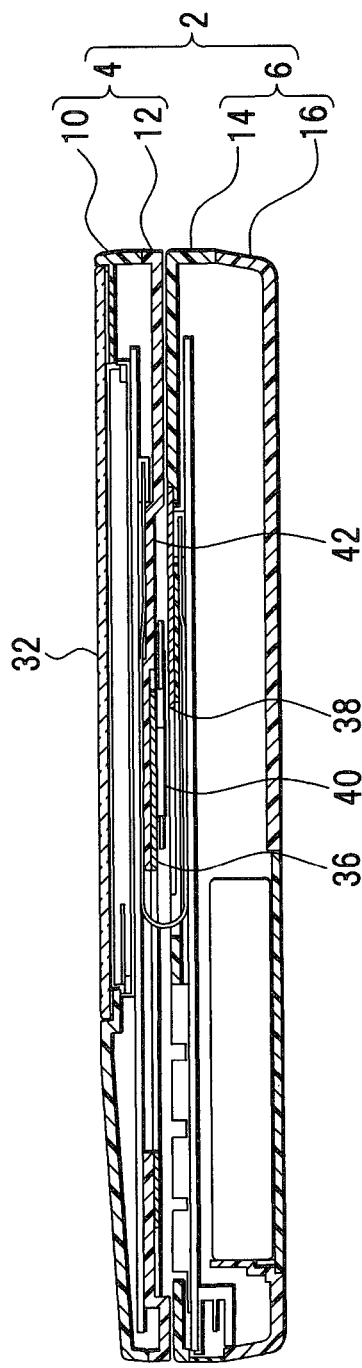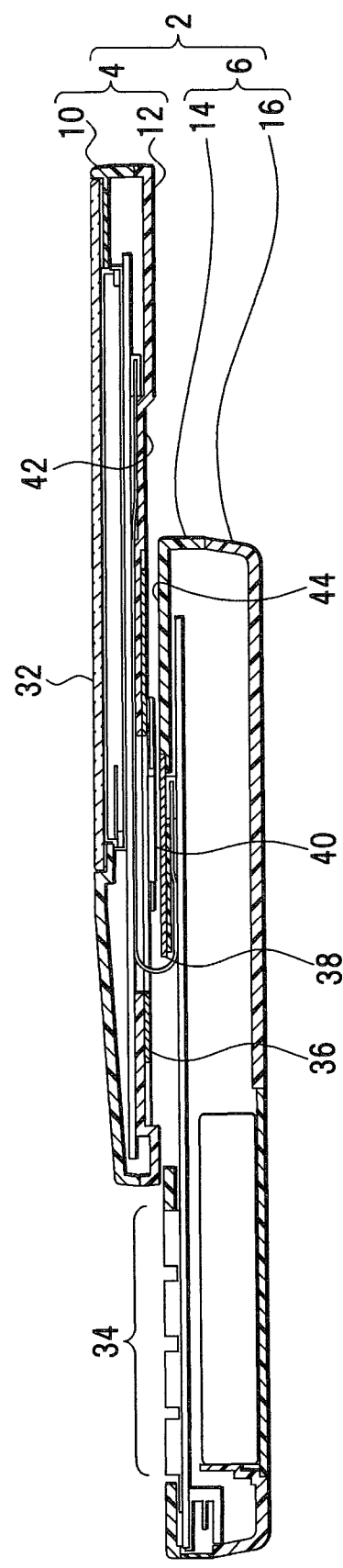

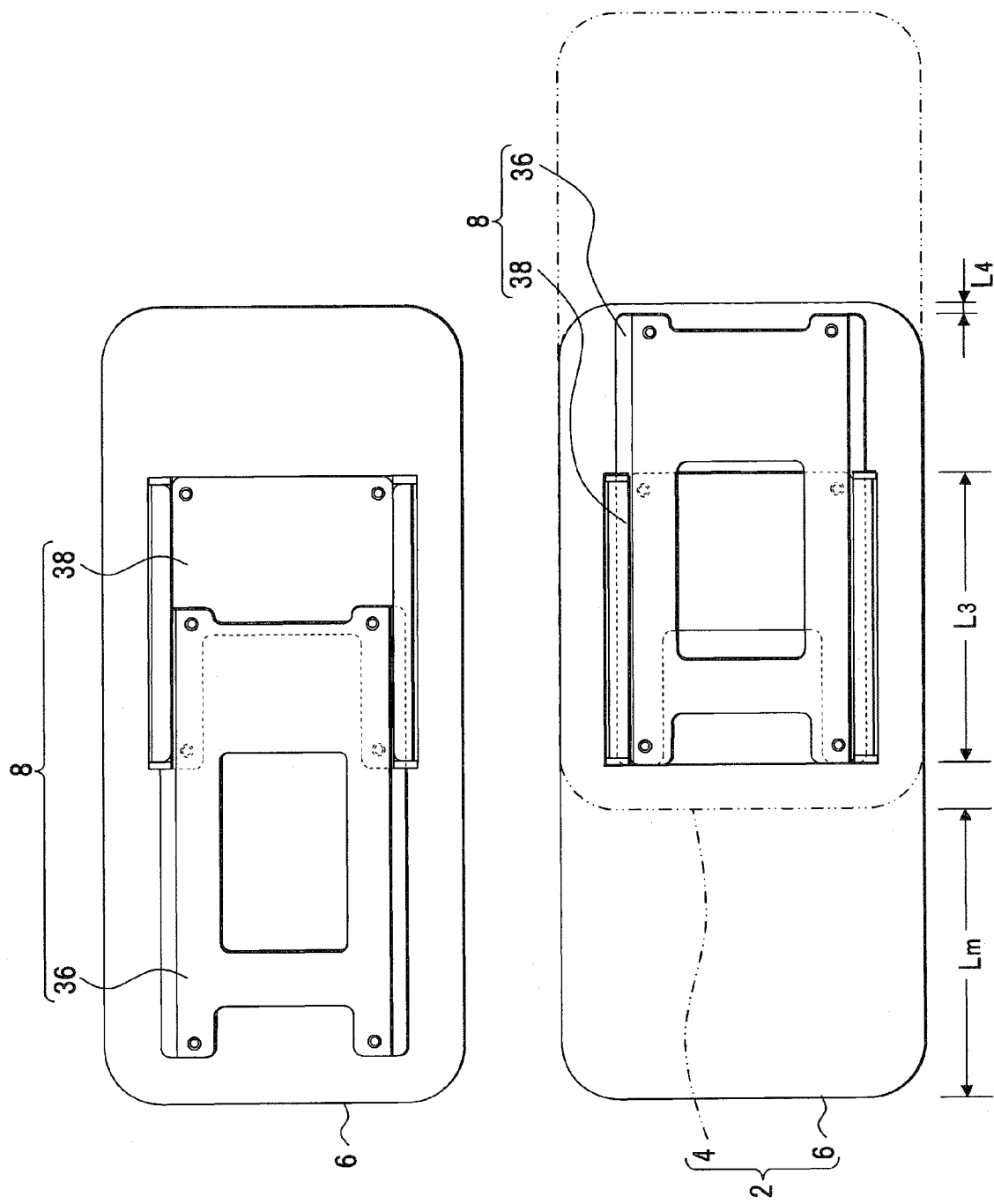

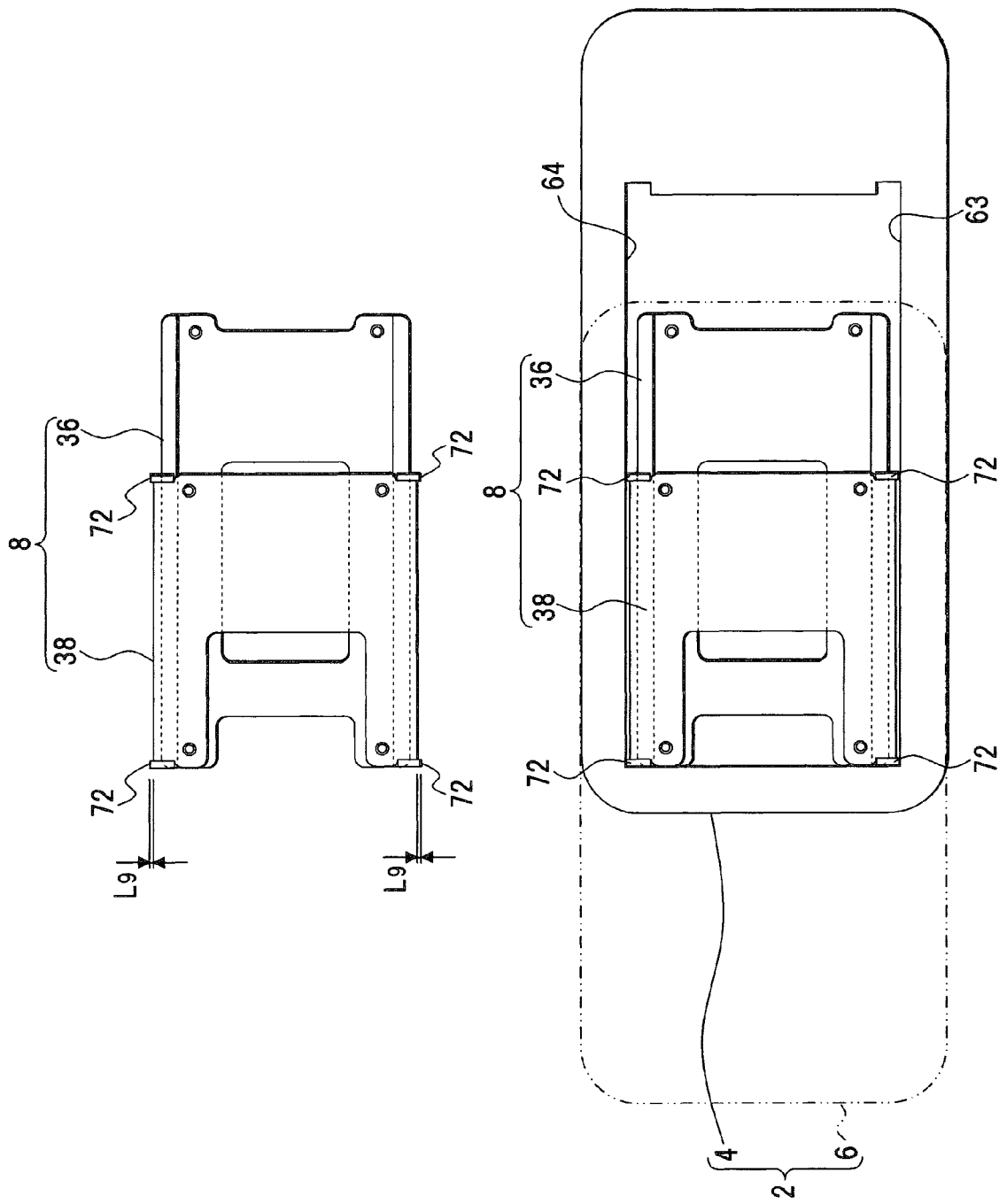

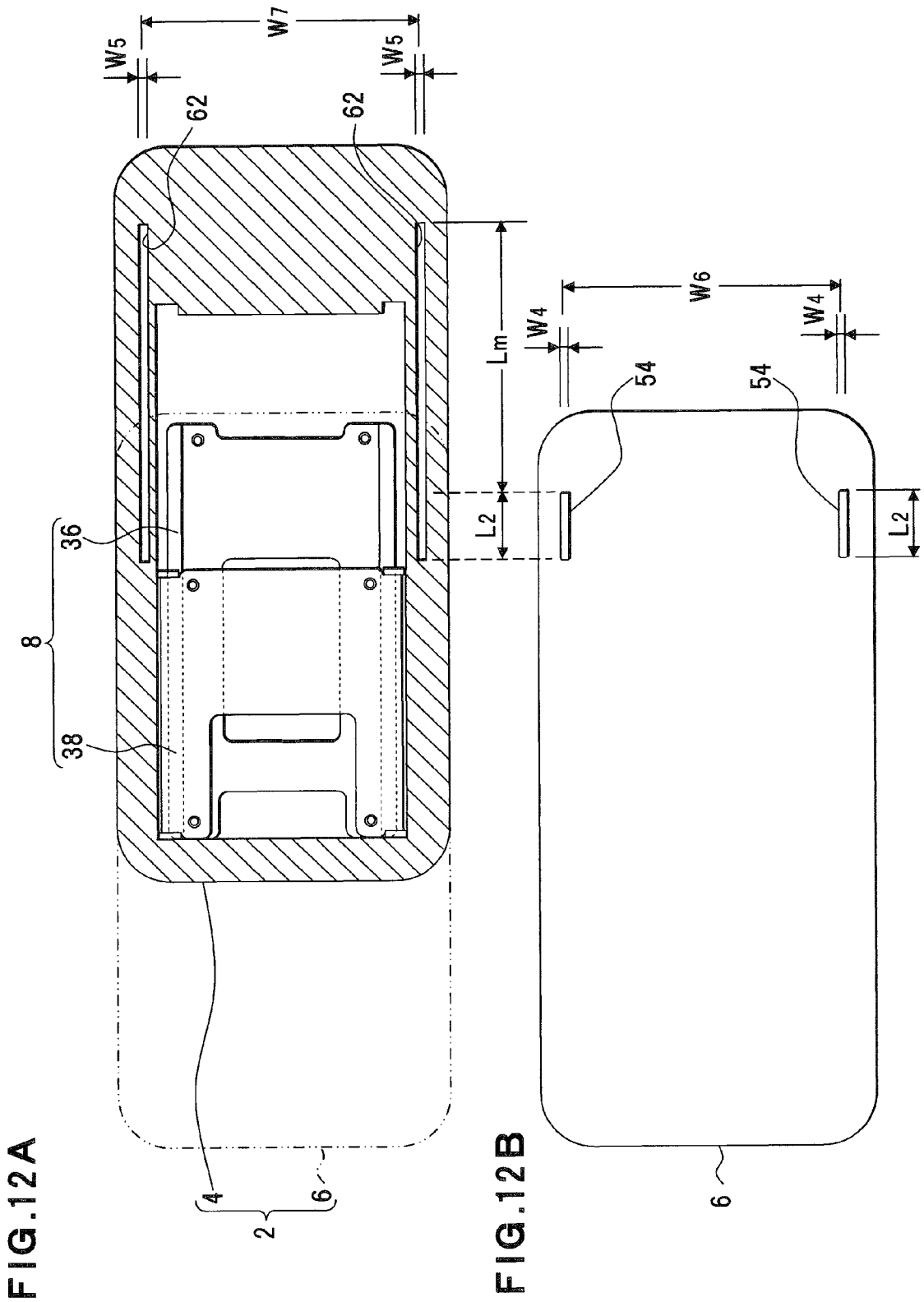

SLIDING MECHANISM, ELECTRONIC APPARATUS AND PORTABLE DEVICE

CROSS-REFERENCE TO RELATED APPLICATIONS

This application is based upon and claims the benefit of priority from the prior Japanese Patent Application No. 2007-196403, filed on Jul. 27, 2007, the entire contents of which are incorporated herein by reference.

BACKGROUND OF THE INVENTION

1. Field of the Invention

The present invention relates generally to a sliding mechanism used for sliding a housing of a portable device such as a portable terminal device and other electronic apparatuses, and more particularly, to a sliding mechanism that slidably connects a plurality of housing units, and an electronic apparatus and portable device that have the sliding mechanism.

2. Description of the Related Art

A portable device such as a portable terminal device that includes a sliding mechanism is known. A housing thereof is divided into a housing unit of a display side and a housing unit of an operation side, thus each housing unit is made slidable. When such portable device is used, a housing unit is slid to be opened for display or operation. When the portable device is not used, the housing unit is closed to be enabled to be lessened.

Concerning a portable device including such sliding mechanism, Japanese Patent Application laid-Open Publication No. 2006-270804 (Abstract, FIG. 1, etc.) discloses that first and second casings are provided, the first casing provides a base member having guide groove(s) and the second casing provides a slider engaged with the guide groove. A biasing means provided between the base member and the first casing, being coupled between the base member and the slider, slides the slider in a closing direction or an opening direction from an opening/closing position.

Japanese Patent Application laid-Open Publication No. 2006-246353 (Abstract, FIG. 3, etc.) discloses that a slidable upper case and lower case are provided. Slide grooves are disposed in each upper and lower case. Via slide grooves of the lower case, slide connection members are fixed to the upper case. Via slide grooves of the upper case, a slide connection member is fixed to the lower case. The upper case and the lower case become slidable by means of each slide connection member one after the other, with a stable connection form in which the upper case and the lower case are mutually connected.

In opening/closing assistant structure in which an upper housing and a lower housing are slidably connected via a slide module, in opening, tension of a spring member is made to operate on the upper housing in order to move the upper housing in an opening direction and in closing, tension of the spring member is inverted to be made to operate on the upper housing in order to move the upper housing in a closing direction. In such sliding mechanism, a slide module connecting an upper housing and a lower housing consists of a fixing part, a slider part, a spring part, etc. Shaking occurring in a lateral direction or a thickness direction of a device in opening or closing depends on accuracy of the slide module. For suppressing such shaking, accuracy of the slide module has been improved. However, it has been difficult to suppress wear by use and shaking by aging. It is more desirable that shaking in a lateral direction or a thickness direction of a device in opening or closing is as little as possible.

In opening and closing, because the fixing part of the slide module and a guide of the slider are connected, and in an opened state, the slider moves in an upper direction from an upper part of the lower housing, a rear surface of the upper housing is within the range of the slider side. For this, efficient use of a mounted area in the device is narrowed, and the device cannot be thinned.

Conventionally, a slide module and a slider are made of metal. If the slider guide is exposed to the rear surface of the device, there is risk that a user touches the exposed part of the slider guide. It is not preferable for safety.

When the device is opened, clearance of a spring in the slide module is necessary for the slider of the slide module connected to the rear surface of the upper housing. There is risk that a foreign object such as trash enters the clearance and the slider languishes.

If there is shaking in a single slide module, great shaking occurs to the device that is opened and closed by the slide module in opening and closing. The shaking gives a user a feeling of roughing.

There is no disclosure and suggestion in Japanese Patent Application laid-Open Publication Nos. 2006-270804 and 2006-246353 concerning such requests and problems, and the structure disclosed in Japanese Patent Application laid-Open Publication Nos. 2006-270804 and 2006-246353 cannot solve the above problems.

SUMMARY OF THE INVENTION

An object of the present invention relates to a sliding mechanism used for an apparatus such as a portable device, and is to contribute to downsizing and/or flatting the apparatus where the sliding mechanism is mounted.

Another object of the present invention relates to a sliding mechanism used for an apparatus such as a portable device, and is to suppress shaking between housing units in an opened state, closed state or on the way to opening/closing.

A still another object of the present invention relates to a sliding mechanism used for an apparatus such as a portable device, and is to enhance safety or prevent intrusion of a foreign object to improve reliability of the apparatus mounted with the sliding mechanism.

In order to achieve the above objects, the present invention provides a slide module between opposed surfaces against a first housing unit and second housing unit to be slid. The slide module slidably supports the first and second housing units. Since the slide module has a slider and a fixing part that slidably supports the slider, it is structured that in case the first and second housing units are in an opened state, the slider is not exposed through the first and second housing units. Structure is included that compared with the first and second housing units in a closed state, in case in the opened state, a guide width of the slider for the fixing part of the slide module is made wider. Such structure achieves the above objects.

In order to achieve the above objects, according to a first aspect of the present invention there is provided a sliding mechanism comprising first and second housing units to be slid and a slide module that is disposed between opposed surfaces of the first housing unit and the second housing unit to slidably support the first and second housing units, wherein the slide module has a slider fixed to the first housing unit and a fixing part fixed to the second housing unit to slidably support the slider, and in case where the first housing unit and the second housing unit are moved into an opened state, the slider is held at a position where an end part of the slider in a sliding direction does not protrude from the second housing unit. According to such structure, the slider is hidden between the first and second housing units regardless of an opened/closed state, thus a user does not touch the slider. Therefore, the above objects can be achieved.

In order to achieve the above objects, according to a second aspect of the present invention there is provided a sliding mechanism comprising first and second housing units to be slid and a slide module that is disposed between opposed surfaces of the first housing unit and the second housing unit to slidably support the first and second housing units wherein the slide module has a slider fixed to the first housing unit and a fixing part fixed to the second housing unit to slidably support the slider, and guide width of the fixing part toward the slider is set wider in an opened state of the first housing unit and the second housing unit compared with the first housing unit and the second housing unit in a closed state. According to such structure, the guide width of the slider of the slide module toward the fixing part becomes wider in case that the first and second housing units are in the opened state rather than in the closed state. Thus, shaking between the housing units is prevented. Therefore, the above objects can be achieved.

In order to achieve the above objects, preferably, in the above sliding mechanism, width in a sliding direction of the fixing part may be set equal to or wider than stroke length between the first and second housing units. According to such setting, the guide width of the slider toward the fixing part becomes wider, and shaking is prevented. Thus, the above objects can be achieved.

In order to achieve the above objects, preferably, in the above sliding mechanism, guide width of the fixing part toward the slider may be narrower than stroke length between the first and second housing units in case where the first housing unit and the second housing unit are in a closed state, and may be equal to or wider than stroke length between the first and second housing units in case where the first housing unit and the second housing unit are in an opened state. Such structure also prevents shaking between the housing units. Thus, the above objects can be achieved.

In order to achieve the above objects, preferably, in the above sliding mechanism, a slide guide face that guides a side part of the fixing part may be provided for the first housing unit over relative movement of the first housing unit and the fixing part of the slide module.

According to such structure, the fixing part of the slide module is guided by the slide guide faces of the first housing unit. In case of relative movement of the first and second housing units or keeping in the opened state thereof, shaking between the housing units is prevented, thus the above objects can be achieved.

In order to achieve the above objects, preferably, in the above sliding mechanism, the slide module provides a spring part in which a compressed state may change according to a stroke position of the slider and fixing part between the slider and fixing part, and in case where the first housing unit and the second housing unit are moved to the longest stroke length, restoring force of the spring part may be made to operate between the slider and the fixing part.

According to such structure, since restoring force of the spring part that operates between the fixing part and the slider operates between the first and second housing units, the first and second housing units in the opened state or the closed state are held in a stable state by the restoring force.

In order to achieve the above objects, preferably, in the above sliding mechanism, the slider of the slide module may be fixed to a recess formed on the opposed surface of the first housing unit, and the fixing part that supports the slider may be fixed to a recess formed on the opposed surface of the second housing unit. According to such structure, the slide module is placed between recesses of the first and second housing units, and is accommodated within the opposed surfaces. Thus, distance between the opposed surfaces of the first and second housing units can be narrowed.

In order to achieve the above objects, preferably, in the above sliding mechanism, a slide member that contacts the slide guide face may be provided for the fixing part. According to such structure, the sliding member can reduce wear between the fixing part of the slide module and the first housing unit to be slid. Preferably, in the sliding mechanism, the slider and/or the fixing part may be formed of a metal plate, and a slide member may be provided between the fixing part and the slider.

In order to achieve the above objects, according to a third aspect of the present invention there is provided an electronic apparatus comprising the above sliding mechanism. Such structure also achieves the above objects.

In order to achieve the above objects, according to a fourth aspect of the present invention there is provided a portable device comprising the above sliding mechanism. Such structure also achieves the above objects.

According to the present invention, following effects can be obtained.

(1) Shaking between the first and second housing units in the opened state, closed state, and on the way to opening/closing can be suppressed.

(2) Since distance between the first and second housing units can be narrowed, downsizing and flatting the apparatus mounted the sliding mechanism with can be facilitated.

(3) Since the slider of the slide module is not exposed, safety can be enhanced.

(4) Since distance between the first and second housing units can be narrowed, intrusion of a foreign object between the housing units can be avoided, and reliability of the apparatus mounted the sliding mechanism with can be improved.

(5) In a portable device and an electronic apparatus where such sliding mechanism is mounted, safety and reliability can be improved along with downsizing and flatting thereof.

Other objects, features, and advantages of the present invention will be understood more clearly by referring to the accompanying drawings and the embodiments.

BRIEF DESCRIPTION OF THE DRAWINGS

FIGS. 8A and 8B show a cross section of the portable device: 8A is a sectional view showing the portable device in the closed state and 8B is a sectional view showing the portable device in the opened state;

FIGS. 9A and 9B show an opened/closed state of the portable device: 9A depicts the portable device in the closed state and 9B depicts the portable device in the opened state;

FIGS. 11A and 11B show the opened state of the portable device: 11A depicts the slide module and 11B depicts the portable device in the opened state; and FIGS. 12A and 12B show opening/closing of the portable device: 12A depicts the upper housing unit of the portable device in the opened state and 12B depicts the lower housing unit of the portable device.

DETAILED DESCRIPTION OF THE PREFERRED EMBODIMENTS

Embodiment

Figure 1:
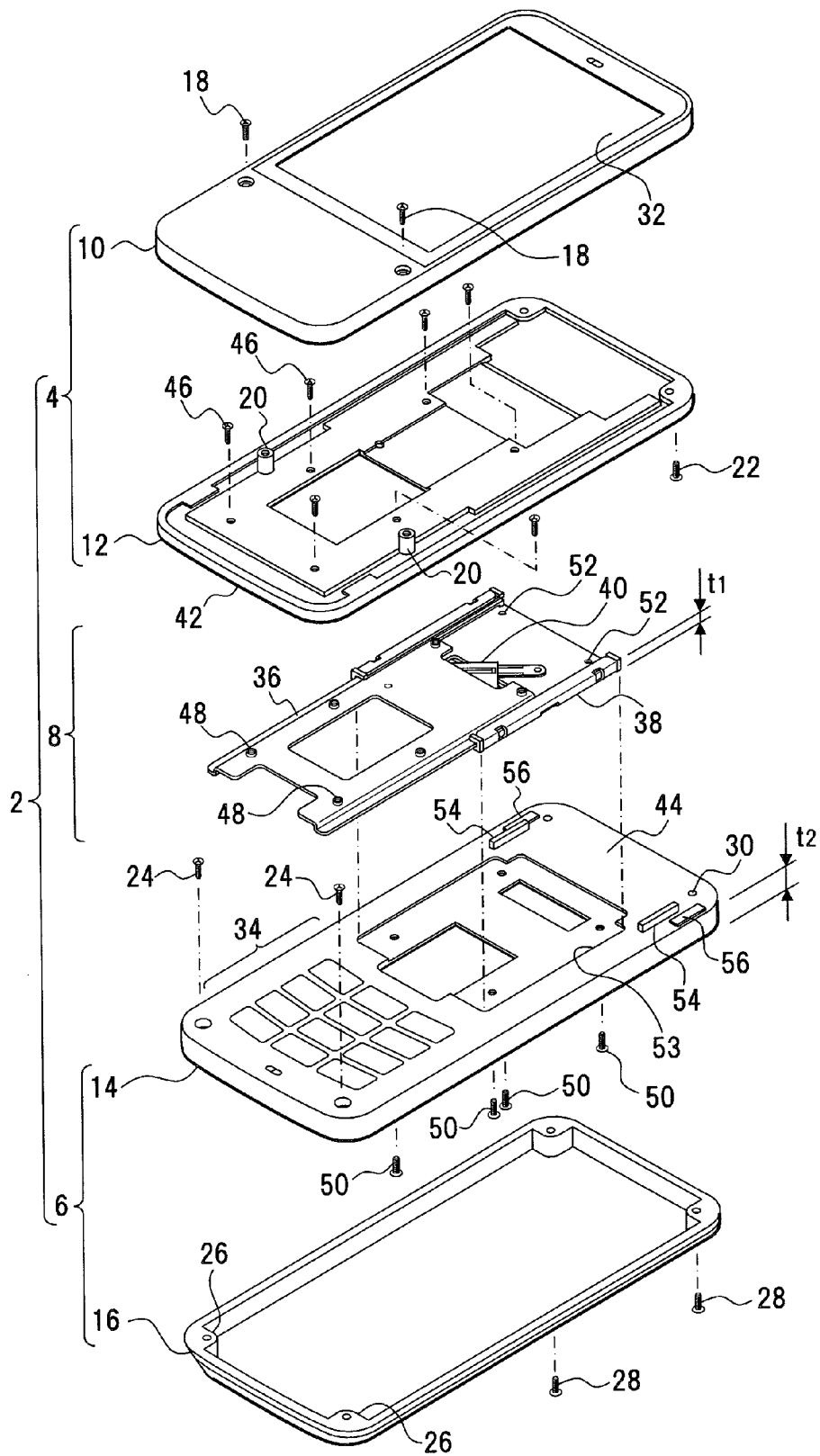
FIG. 1 is an exploded perspective view of a portable device according to an embodiment.

An embodiment of a sliding mechanism, an electronic apparatus and a portable device of the present invention will now be described with reference to FIG. 1. FIG. 1 is an exploded perspective view exemplifying a portable device where a sliding mechanism is mounted.

This portable device 2 is an example of a sliding mechanism, an electronic apparatus and a portable device. In this embodiment, an upper housing unit 4 as a first housing unit (for example, a movable housing unit) and a lower housing unit 6 as a second housing unit (for example, a fixed housing unit) are provided. A slide module 8 is provided between opposed surfaces of the upper housing unit 4 and lower housing unit 6. That is, the upper housing unit 4 and the lower housing unit 6 are slidably connected by the slide module 8. The upper housing unit 4, the lower housing unit 6 and the slide module 8 constitute a sliding mechanism as an example. The upper housing unit 4 and the lower housing unit 6 are compacts made of synthetic resin, etc. Concerning the upper housing unit 4 and lower housing unit 6, if the lower housing unit 6 is fixed and the upper housing unit 4 is moved, the upper housing unit 4 is a movable housing unit and the lower hosing unit 6 is a fixed housing unit. If the upper housing unit 4 is fixed and the lower housing unit 6 is moved, the upper housing unit 4 is a fixed housing unit and the lower hosing unit 6 is a movable housing unit. It depends on how each housing unit is used whether the housing unit is named a movable housing unit or a fixed housing unit.

The upper housing unit 4 includes housings 10 and 12. The lower housing unit 6 includes housings 14 and 16. The housings 10 and 12 are solidly fixed. In this case, a plurality of screws 18 inserted from the housing 10 side are screwed into screw fixing parts 20 on the housing 12 and a plurality of screws 22 inserted from a rear side of the housing 12 are screwed into the housing 10. Thus, the housings 10 and 12 are fixed. Also, the housings 14 and 16 are solidly fixed. In this case, a plurality of screws 24 inserted from the housing 14 side are screwed into screw fixing parts 26 on the housing 16 and a plurality of screws 28 inserted from a rear side of the housing 16 are screwed into screw fixing parts 30 on the housing 14. Thus, the housings 14 and 16 are fixed.

A display 32 is placed on the upper housing unit 4. The display 32 consists of, for example, an LCD (Liquid Crystal Display) device. An operation part 34 made out of a plurality of keys, and so on are placed on the lower housing unit 6.

A slider 36, a fixing part 38 and a spring part 40 are provided for the slide module 8. The slider 36 is slidably supported by the fixing part 38. The slider 36 is fixed at an opposed surface 42 side of the upper housing unit 4. The fixing part 38 is fixed at an opposed surface 44 side of the lower housing unit 6. In this case, a plurality of fixing screws 46 inserted from a top surface of the housing 12 (a rear side of the opposed surface 42) of the upper housing unit 4 are screwed into screw fixing parts 48 formed on the slider 36. Thus, the housing 12 is fixed into the slider 36. Also, a plurality of fixing screws 50 inserted from the opposed surface 44 side of the housing 14 of the lower housing unit 6 are screwed into screw fixing parts 52 formed on the fixing part 38. Thus, the housing 14 of the lower housing unit 6 is fixed to the fixing part 38.

A recess 53 is formed on the opposed surface 44 of the housing 14 of the lower housing unit 6 for fixing the fixing part 38 of the slide module 8. The fixing part 38 of the slide module 8 is fixed on the recess 53 by fitting into the recess 53. Let thickness of the fixing part 38 of the slide module 8 be t1, thickness of the housing 14 be t2 and thickness in case that both of them are united be t3. Since the fixing part 38 is entered in the housing 14 in accordance with depth of the recess 53, thickness t3 is thinner than an additional value of thickness t1 and t2 (t1+t2). That is, t3<(t1+t2). Therefore, flatting of the lower housing unit 6 side including the housing 14 can be facilitated.

A pair of slide projections 54 are formed on the opposed surface 44 of the housing 14 in parallel with centering the recess 53. The slide projection 54 is a stopper that regulates a moving range of the upper housing unit 4, and is formed in a rectangular parallelepiped with certain width. A pair of pads 56 formed from an elastic material are attached to an adjacent position of each slide projection 54 as elastic members made to intervene between the upper housing unit 4. The pad 56 intervenes between the opposed surfaces 42 and 44, and contributes to smooth slide of the upper housing unit 4 and the lower housing unit 6.

Figure 2:
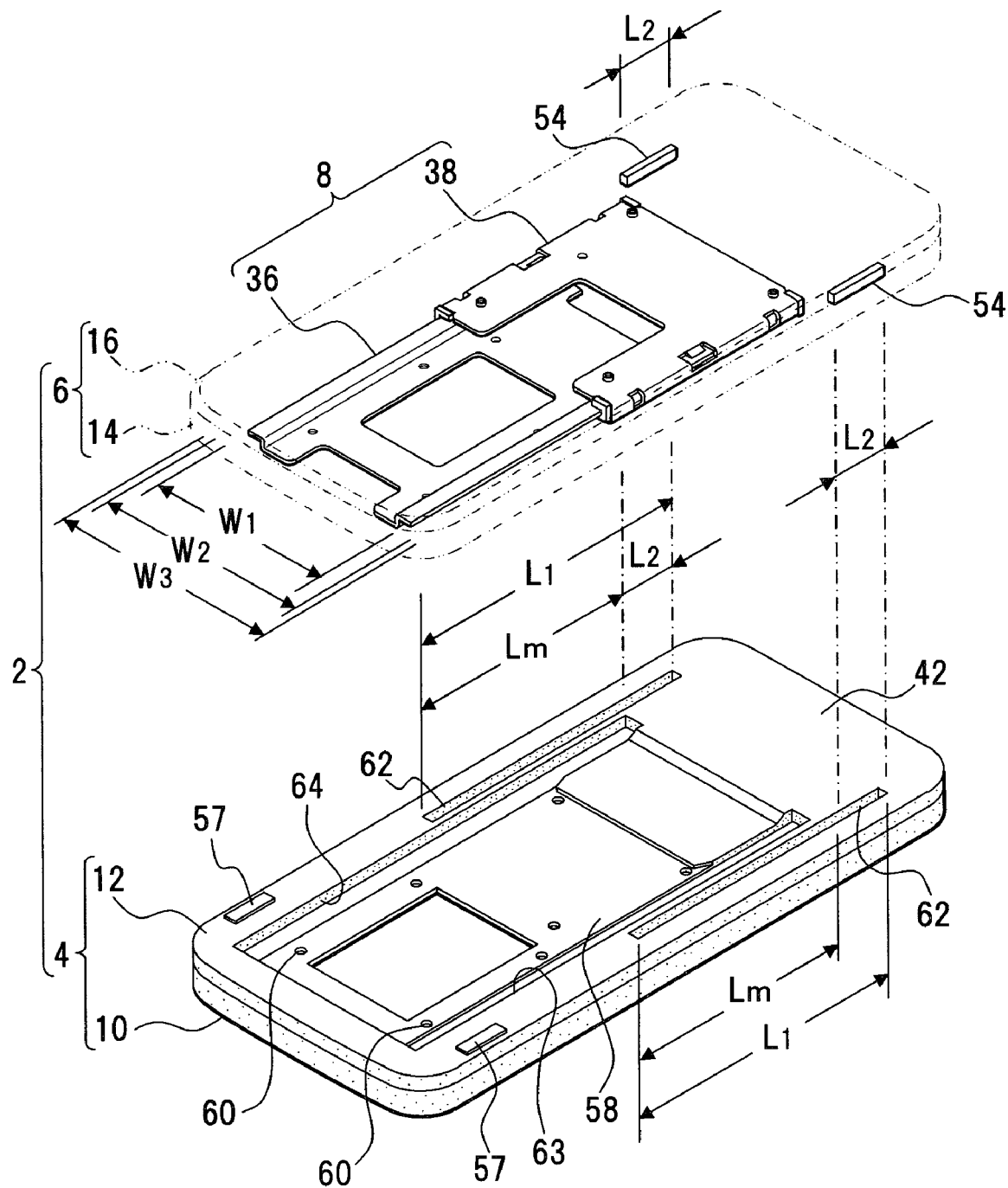
FIG. 2 is an exploded perspective view showing an undersurface of an upper housing unit of the portable device.

A form of the opposed surface 42 of the housing 12 of the upper housing unit 4 will now be described with reference to FIG. 2. FIG. 2 is a perspective view showing the opposed surface of the upper housing unit up. In FIG. 2, the same components as described in FIG. 1 are denoted by the same reference numerals.

A recess 58 that is a rectangular is formed on the opposed surface 42 of the housing 12 for disposing the slide module 8. The slider 36 of the slide module 8 is fixed onto the interior of the recess 58. A plurality of through holes 60 are penetrating holes for penetrating the fixing screws 46. A pair of slide grooves 62 are formed at positions by which the recess 58 is sandwiched for inserting the slide projection 54 of the opposed surface 44 to be slid. Let length of the slide groove 62 be L1, length of the slide projection 54 be L2 and width where the upper housing unit 4 slides be Lm. Lm becomes a value that the length L2 of the slide projection 54 is subtracted from the length L1 of the slide groove 62, that is, L1-L2.

Let width of the slider 36 of the slide module 8 be W1, width of the fixing part 38 be W2 and width of the recess 58 be W3. The width W1, W2 and W3 are, W1<W2≈(≦)W3. Along inner wall parts of the recess 58, slide guide faces 63 and 64 that guide the fixing part 38 are formed.

A pair of pads 57 formed from an elastic material are attached to the opposed surface 42 of the housing 12 as elastic members made to intervene between the lower housing unit 6. The pad 57 intervenes between the opposed surfaces 42 and 44, and contributes to smooth slide of the upper housing unit 4 and the lower housing unit 6.

Figure 3:
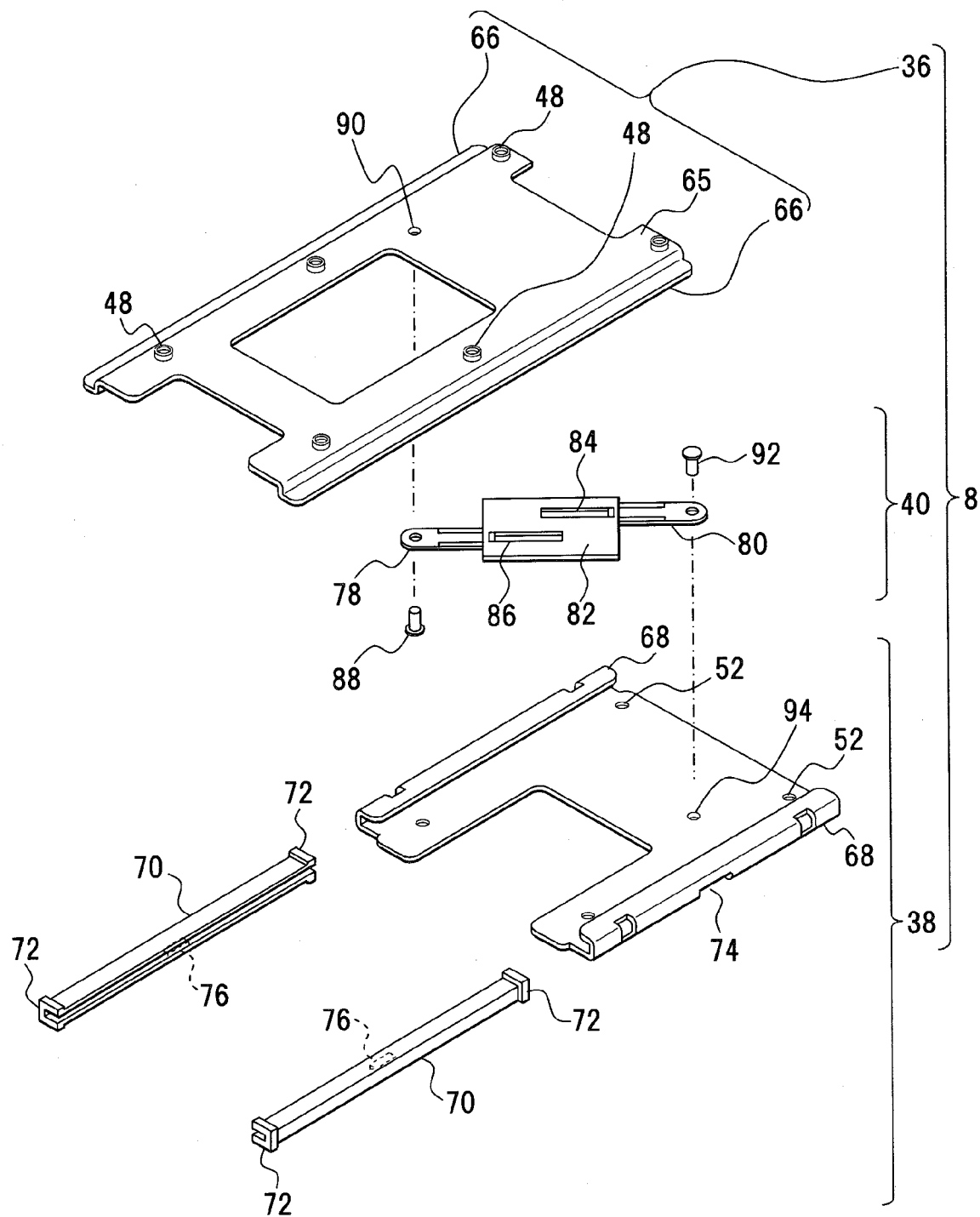
FIG. 3 is an exploded perspective view showing a slide module.
Figure 4:
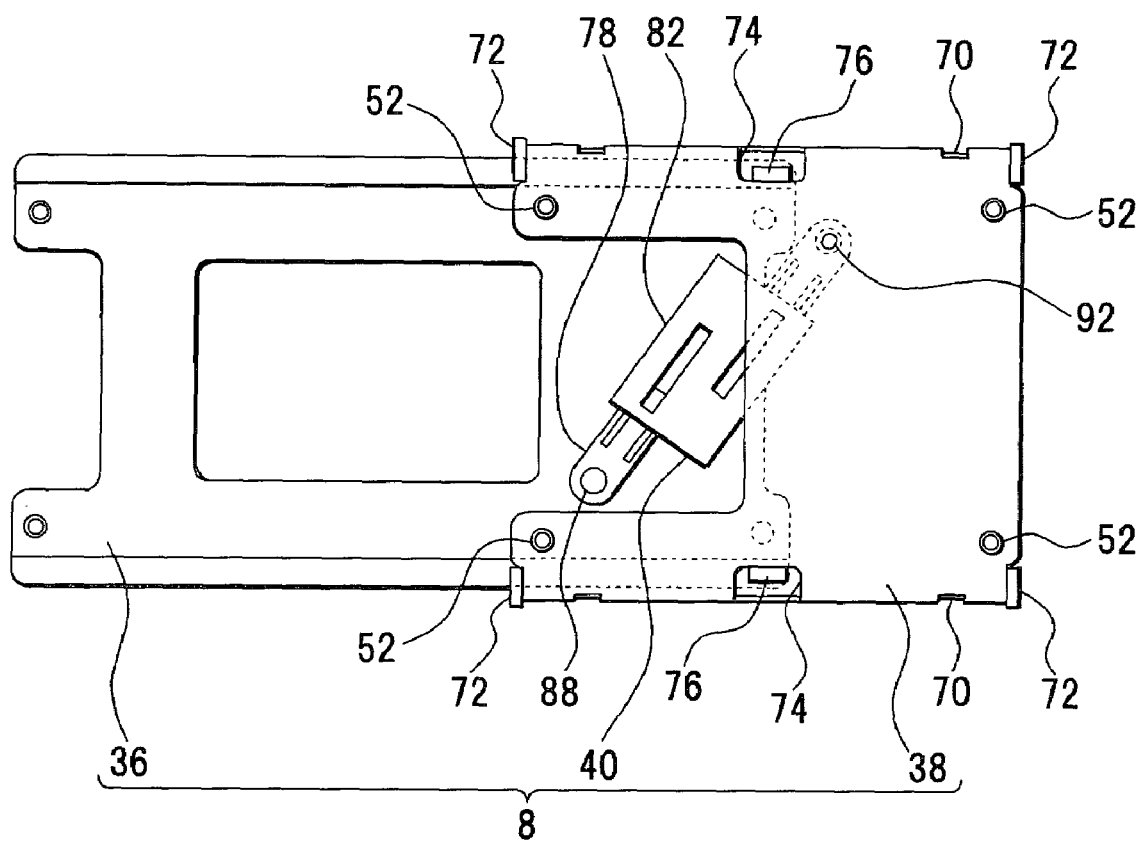
FIG. 4 depicts the slide module.

The slide module 8 will now be described with reference to FIGS. 3 and 4. FIG. 3 is an exploded perspective view of the slide module and FIG. 4 depicts the slide module shown in FIG. 3 viewed from a rear side. In FIGS. 3 and 4, the same components as described in FIG. 1 are denoted by the same reference numerals.

The slider 36 is a frame body formed from a rigid material such as a rectangular metal plate. The slider 36 includes protrusions 65 and slide edge parts 66. The protrusion 65 is formed by providing a step in parallel at the slide edge part 66 of the slider 36 forming a frame body to be bent. The slide edge part 66 is formed along a parallel straight line part with centering the protrusion 65.

The fixing part 38 is a frame body corresponding to the slide edge part 66 of the slider 36. Groove parts 68 that have C-shaped cross sections are formed in the fixing part 38. The groove part 68 slidably supports the slide edge part 66. Into each groove part 68, a spacer 70 is placed with being fit. Each spacer 70 is a frame body that has a C-shaped cross section, and is made of a lubricating material such as synthetic resin. Each spacer 70 is a guide member for guiding slide of the slide edge part 66 of the slider 36, and also, is a slide member for sliding the housing 12 of the upper housing unit 4. Each spacer 70 intervenes between an inner wall part of the groove part 68 and the slide edge part 66 of the slider 36. The spacer 70 is held in the groove part 68 of the fixing part 38 so that the slide edge part 66 slides smoothly. At ends of each spacer 70, flange parts 72 as slide members are formed. Each flange part 72 is exposed at the end part of the groove part 68 of the fixing part 38. A through hole part 74 is formed at the groove part 68. A projection 76 formed on the spacer 70 engages the through hole part 74 as shown in FIG. 4. The projection 76 prevents the spacer 70 from falling out of the groove part 68.

The spring part 40 is attached between the slider 36 and the fixing part 38. Arms 78 and 80 are attached to the spring part 40 in parallel to a frame 82 via springs 84 and 86. The arm 78 as a fixing means is fixed to a support hole 90 of the slider 36 by a support pin 88 rotatably with centering the support pin 88, for example. The arm 80 is fixed to a support hole 94 of the fixing part 38 by a support pin 92 rotatably with centering the support pin 92 as well.

The spring part 40 has two opening positions (an opening position and a closing position of the portable device 2) for a slide on the fixing part 38. If the slider 36 is slid from one opening position to the other opening position, the springs are gradually becoming in compression on the way to the slide. After arrival at the peak compression, the compressed state switches to a compression released state by restoring force. Since the restoring force operates on the slider 36, the slider 36 is moved to the other opening position.

Figure 5:
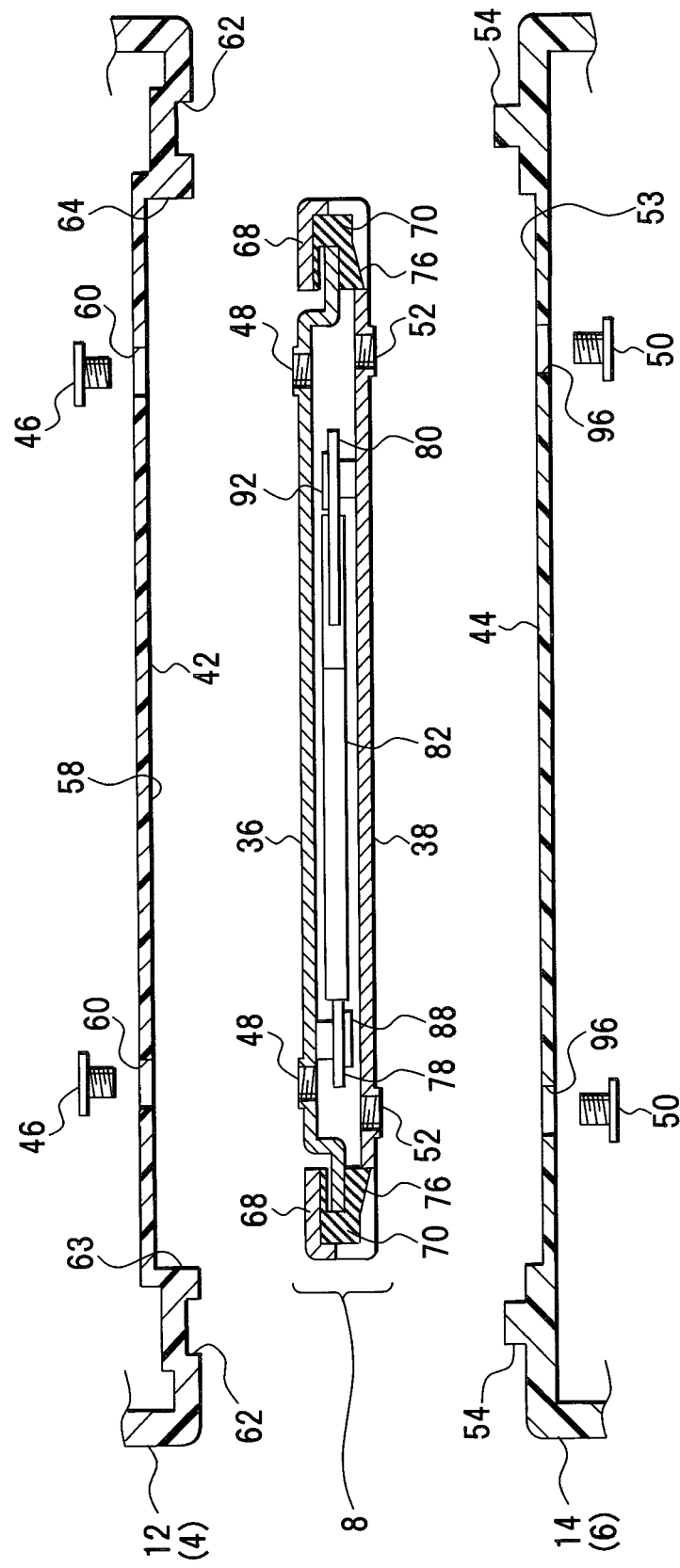
FIG. 5 is an exploded sectional view showing the upper housing unit, a lower housing unit and the slide module.
Figure 6:
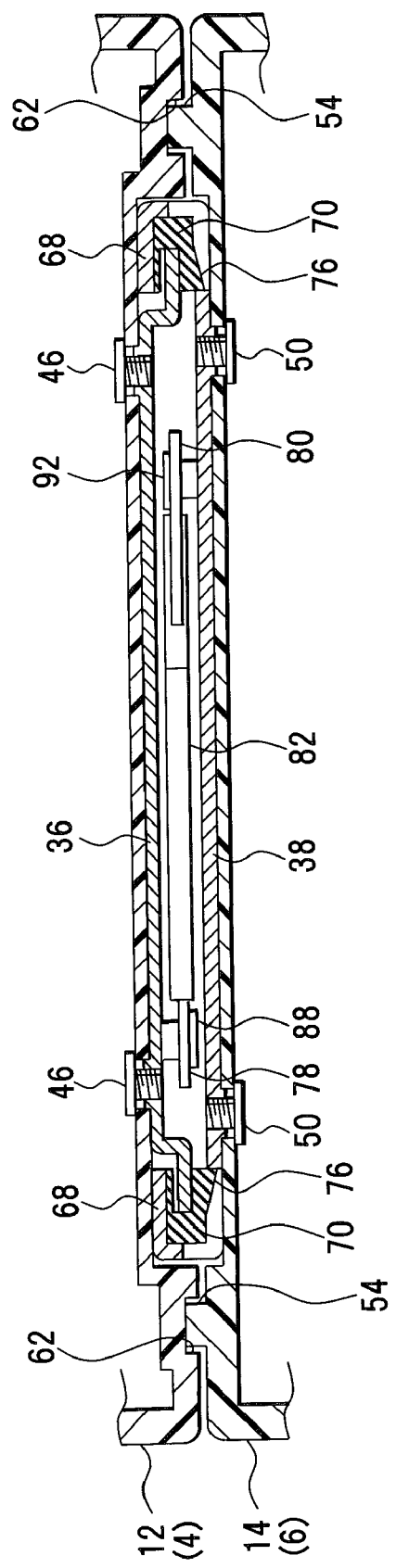
FIG. 6 is a sectional view showing fixation structure of the slide module.

The sliding mechanism will now be described with reference to FIGS. 5 and 6. FIG. 5 is an exploded sectional view showing the upper housing unit, the lower housing unit and the slide module before connection. FIG. 6 is a sectional view showing the upper housing unit, the lower housing unit and the slide module after connection. In FIGS. 5 and 6, the same components as described in FIGS. 1, 2 and 3 are denoted by the same reference numerals.

As shown in FIG. 5, a plurality of fixing screws 46 inserted from a rear side of the housing 12 via the through holes 60 are fixed in the screw fixing part 48 of the slide module 8. Thus, the slider 36 of the slide module 8 is fixed in the interior of the recess 58 of the housing 12 on the opposed surface 42 of the housing 12 of the upper housing unit 4. A plurality of fixing screws 50 inserted from a rear side of the housing 14 via the through holes 96 are fixed in the screw fixing part 52 of the slide module 8. Thus, the fixing part 38 of the slide module 8 is fixed in the interior of the recess 53 of the housing 14 on the opposed surface 44 of the housing 14 of the lower housing unit 6.

As a result, the housing 12 of the upper housing unit 4 and the housing 14 of the lower housing unit 6 are connected by the medium of the slide module 8. Since the housing 12 is fixed to the slider 36 and the housing 14 is fixed to the fixing part 38, the upper housing unit 4 and the lower housing unit 6 are slidably connected by the slide module 8.

Figure 7A:
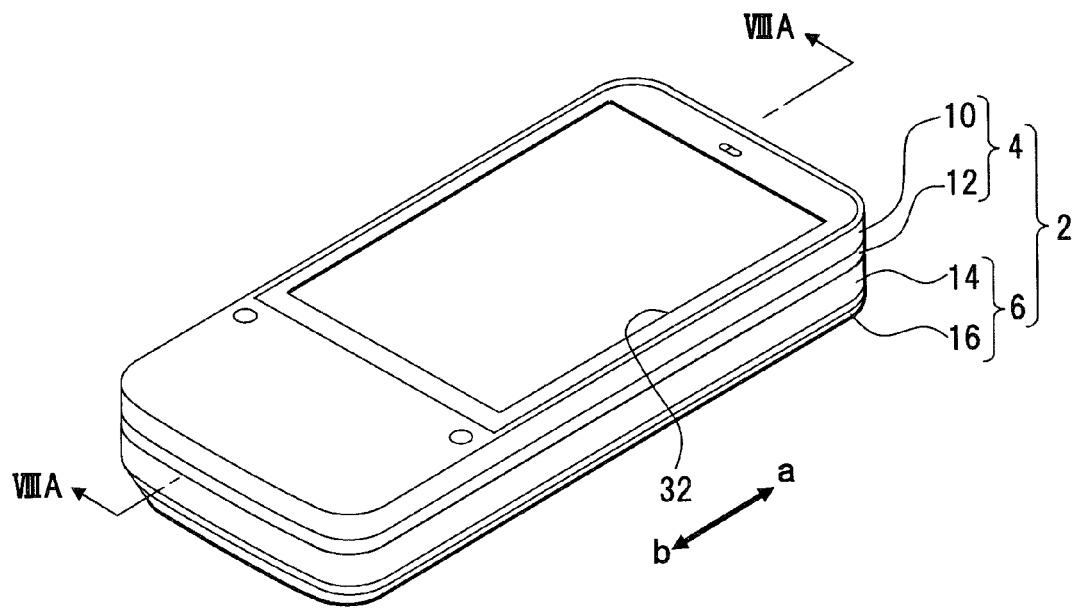
FIGS. 7A and 7B show the portable device: 7A is a perspective view showing the portable device in a closed state and 7B is a perspective view showing the portable device in an opened state.
Figure 7B:
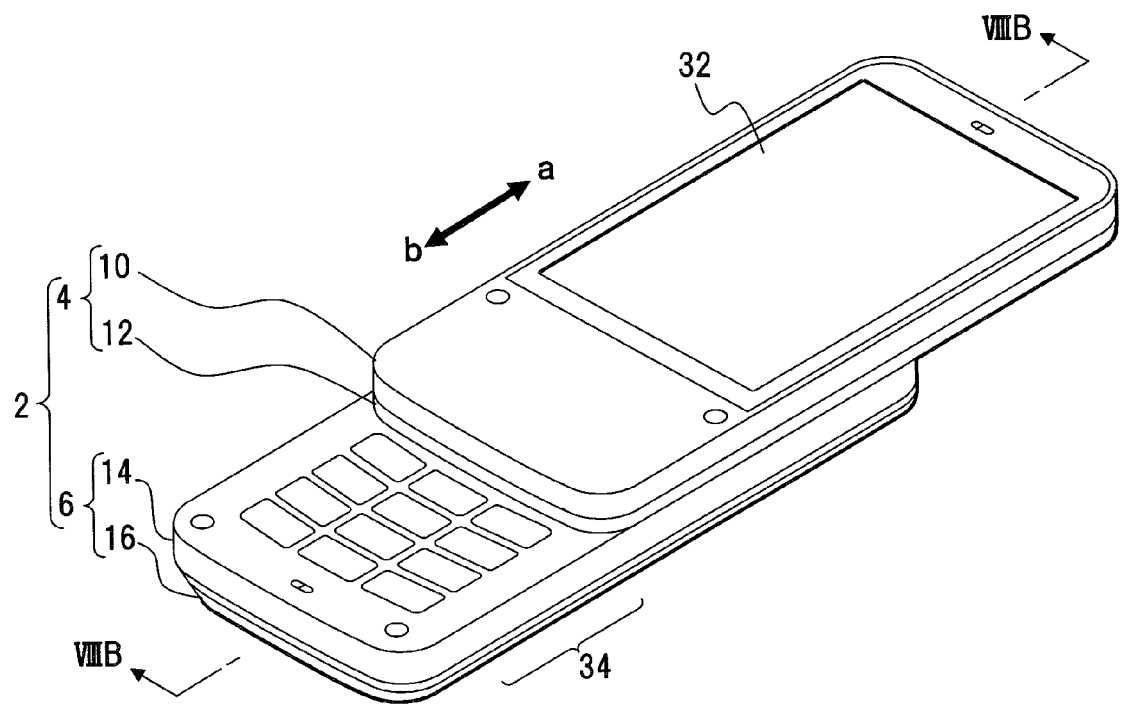

According to the portable device 2 providing such sliding mechanism, as shown in FIGS. 7A and 8A, if the upper housing unit 4 is slid backward, the portable device 2 becomes in a closed state that the upper housing unit 4 corresponds to the lower housing unit 6 (an arrow a shows an opening direction). As shown in FIGS. 7B and 8B, if the upper housing unit 4 is slid forward, the portable device 2 becomes in an opened state that the upper housing unit 4 is dislocated forwarder than the lower housing unit 6 to be maintained (an arrow b shows a closing direction). FIG. 8A is a sectional view of FIG. 7A along the line VIIIA-VIIIA. FIG. 8B is a sectional view of FIG. 7B along the line VIIIB-VIIIB.

Opening and closing of the upper housing unit 4 and the lower housing unit 6 will now be described with reference to FIGS. 9A and 9B. FIGS. 9A and 9B show the opened/closed state of the upper housing unit and the lower housing unit: 9A depicts the closed state and 9B depicts the opened state. In FIGS. 9A and 9B, the same components as described in FIGS. 1, 2, 3, 4, 5 and 6 are denoted by the same reference numerals.

The slider 36 and fixing part 38 of the slide module 8 disposed between the upper housing unit 4 and the lower housing unit 6 are fixed in shorter length than the longest stroke length of the slide module 8 with the spring part 40 in compression. Restoring force of the spring part 40 operates on the upper housing part 4 and the lower housing part 6 in the closed state in a closing direction, thus, the stable closed state is maintained. That is, the upper housing unit 4 and the lower housing unit 6 cannot be opened as long as force in an opening direction against the restoring force of the spring part 40 is applied.

As clarified from the opened state and the closed state, for slide stroke length (width) Lm of the upper housing unit 4 against the lower housing unit 6, let length (width) in sliding direction of the fixing part 38, that is, guide length (width) of the slider 36 be L3. A magnitude relationship between Lm and L3 is set in L3≧Lm. In this case, since the guide length L3 is equal to the stroke length Lm, shaking between the upper housing unit 4 and the lower housing unit 6 can be suppressed.

In the opened state, let distance between a tip part of the slider 36 fixed to the upper housing unit 4 and a tip part of the lower housing unit 6 be L4. Since L4≧0 is set, the slider 36 is hidden between the upper housing unit 4 and the lower housing unit 6. Thus, if the upper housing unit 4 slides to the longest stroke length, the slider 36 does not protrude and is not exposed from the lower housing unit 6, and safety can be enhanced.

In the preferred embodiment, for the slide stroke length (width) Lm=40 (mm), the guide length (width) L3=40.5 (mm) and the distance L4=1.6 (mm).

Figures 10A, 10B:
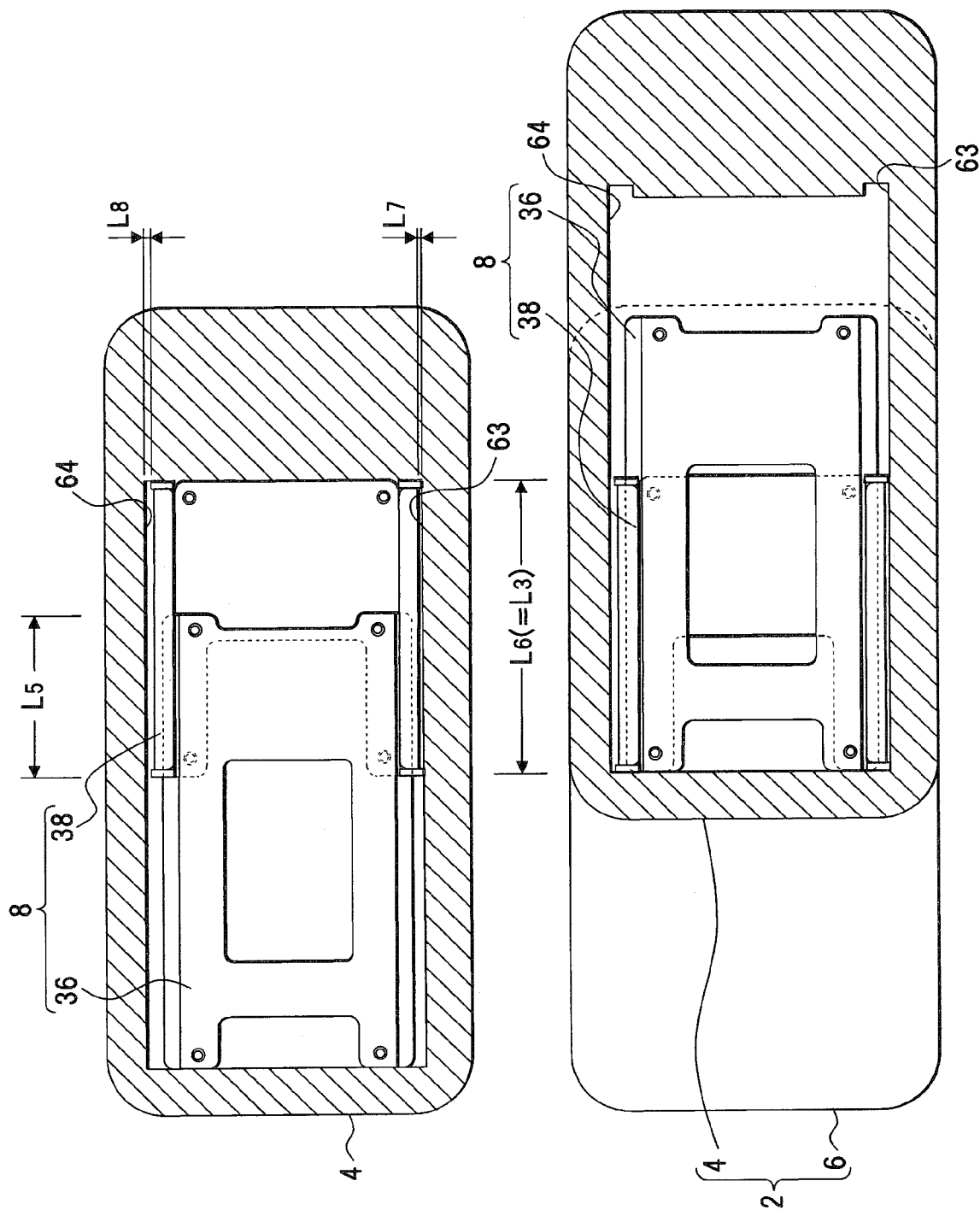
FIGS. 10A and 10B show the opened/closed state of the portable device: 10A depicts the portable device in the closed state and 10B depicts the portable device in the opened state.

Opening and closing of the upper housing unit 4 and the lower housing unit 6 will now be described with reference to FIGS. 10A and 10B. FIGS. 10A and 10B show the opened/closed state of the upper housing unit and the loser housing unit: 10A depicts the closed state and 10B depicts the opened state. In FIGS. 10A and 10B, the same components as described in FIGS. 1, 2, 3, 4, 5 and 6 are denoted by the same reference numerals.

The slider 36 of the slide module 8 is fixed to the upper housing unit 4 that is a movable housing unit. The fixing part 38 of the slide module 8 is fixed to the lower housing unit 6 that is a fixed housing unit. As described above, in case the upper housing unit 4 and the lower housing unit 6 are in the closed state, the slider 36 and fixing part 38 of the slide module 8 are in a state that the length thereof is shorter than the longest stroke length. That is, the spring part 40 of the slide module 8 is in compression. In the closed state, as shown in FIG. 10A, let length where the fixing part 38 and the slider 36 are superimposed, that is, guide length be L5, and in the opened state from the closed state, as shown in FIG. 10B, let length where the fixing part 38 and the slider 36 are superimposed, that is, guide length be L6. The guide length L6 is identical with the length L3 of the fixing part 38. L5 and L6 are L5<L6 (=L3). As a result, a part in a guide state of the slider 36 is larger in the opened state than in the closed state. Thus, since guide length in the opened state becomes longer, shaking between the upper housing unit 4 and the lower housing unit 6 is reduced.

Let distance between one edge part of the fixing part 38 fixed to the lower housing unit 6 and the slide guide face 63 of the upper housing unit 4 be L7, and let distance between the other edge part of the fixing part 38 and the slide guide face 64 of the upper housing unit 4 be L8. The distances L7 and L8 are set in L7<L8. One edge part of the fixing part 38 is set to contact the slide guide face 63. That is, relationship is that the slide guide face 63 mainly contacts the fixing part 38, and is guided by the fixing part 38. From such setting, in case the state is moved from the closed to the opened, or from the opened to the closed, a stable slid state can be obtained.

According to the preferred embodiment, in the closed state, the guide width L5 of the fixing part 38 of the single slide module 8 is 22 (mm) and in the opened state, the guide width L6=40.5 (mm). In the opened state, shaking becomes smaller, and in the closed state, shaking becomes greater. Then, in order that shaking in the closed state and shaking in the opened state are equal and are suppressed rather than the single slide module 8, shaking in the closed state is equal to that in a state where the guide length L6=40.5 (mm) by suppressing clearance between the slide guide face 63 that is a guide part formed at the upper housing unit 4 and the edge part of the fixing part 38, that is, shaking of the single slide module 8 in a lateral direction L7 in approximately 0.1 (mm).

Opening and closing of the upper housing unit 4 and the lower housing unit 6 will now be described with reference to FIGS. 11A and 11B. FIGS. 11A and 11B show the opened state of the upper housing unit and the lower housing unit: 11A depicts the slide module and 11B depicts the opened state. In FIGS. 11A and 11B, the same components as described in FIGS. 1, 2, 3, 4, 5 and 6 are denoted by the same reference numerals.

As shown in FIG. 11A, at the fixing part 38 of the slide module 8, a slide projection is formed by the flange part 72 of the spacer 70 at each corner. If let projection length of the slide projection be L9, in the preferred embodiment, L9 may be set in 0.1 (mm). As shown in FIG. 11B, in case the state is moved from the closed to the opened or from the opened to the closed, such slide projection contacts the slide guide faces 63 and 64 of the upper housing unit 4. Thus, the upper housing unit 4 is guided by the fixing part 38, and a smooth slid state can be obtained.

Opening and closing of the upper housing unit 4 and the lower housing unit 6 will now be described with reference to FIGS. 12A and 12B. FIGS. 12A and 12B show the upper housing unit and the loser housing unit: 12A depicts the upper housing unit in the opened state and 12B depicts the lower housing unit. In FIGS. 12A and 12B, the same components as described in FIGS. 1, 2, 3, 4, 5 and 6 are denoted by the same reference numerals.

The slide groove 62 is formed in the upper housing unit 4 as shown in FIG. 12A. The slide projection 54 formed on the lower housing unit 6 is inserted to the slide groove 62, and is guided in opening and closing as shown in FIG. 12B. Let width of the slide projection 54 be W4, width of the slide groove 62 be W5, center distance of each slide projection 54 be W6, and center distance of each slide groove 62 be W7. By W4<W5 and W4≈W5, and W6=W7 being set, a stable slid state can be obtained and a stable engaged state between the upper housing unit 4 and the lower housing unit 6 can be also maintained by engagement relationship between the slide projection 54 and the slide groove 62. Shaking between the upper housing unit 4 and the lower housing unit 6 can be suppressed.

As described above, in the portable device 2 and other electronic apparatuses including the upper housing unit 4 and the lower housing unit 6, it is possible to save space, thin the device and reduce shaking in operation.

Other Embodiments (1) While the upper housing unit 4 as the first housing unit and the lower housing unit 6 as the second housing unit are exemplified in the above embodiment, it may be set that the upper housing unit 4 is the second housing unit and the lower housing unit 6 is the first housing unit.

(2) While the slide groove 62 is set on the upper housing unit 4 and the slide projection 54 is set on the lower housing unit 6 in the above embodiment, it may be structured that the slide projection 54 is formed on the upper housing unit 4 and the slide groove 62 is formed on the lower housing unit 6, and both of them are connected.

(3) In the above embodiment, the slider 36 is fixed at the upper housing unit 4 side and the fixing part 38 is fixed at the lower housing unit 6 side. It may be structured that the fixing part 38 is fixed at the upper housing unit 4 side and the slider 36 is fixed at the lower housing unit 6 side.

(4) While the portable device 2 is exemplified in the above embodiment, the present invention can be applied to an apparatus that has a slidable housing unit. The present invention can be applied to a personal computer, a PDA, a video camera, a game machine, etc., as an electronic apparatus except the portable device 2.

While the most preferred embodiments of the present invention have been described, the description is not intended to limit the present invention. Various modifications and revisions of the embodiments can be made by those skilled in the techniques in accordance with the points and gist of the invention that are described in the claims or disclosed in the specification. These modifications and revisions surely fall within the true scope of the present invention.

The present invention relates to a sliding mechanism used for a device such as a portable device, and a portable device and electronic apparatus where the slide mechanism is mounted. Shaking between the first and the second housing units in the opened state, closed state or on the way to opening/closing can be suppressed, and distance between the first and the second housing units can be narrowed. Thus, the present invention is useful for downsizing and flatting the device mounted with the sliding mechanism, etc.

What is claimed is:
1. An electronic apparatus, comprising:
first and second housing units to be slid; and
a slide module that is disposed between opposed surfaces of the first housing unit and the second housing unit to slidably support the first and second housing units, wherein
the slide module has a slider fixed to the first housing unit and a fixing part fixed to the second housing unit to slidably support the slider,
the first housing unit provides slide guide faces that guide a side part of the fixing part over relative movement of the first housing unit and the fixing part of the slide module, the slider is fixed to the first housing unit between the slide guide faces, in case where the first housing unit and the second housing unit are slid to be an opened state, a position of an end of a stroke of the slider is set at an end part of the fixing part, and end parts of the slider in a sliding direction are hidden so as not to protrude from the second housing unit.

2. The electronic apparatus of claim 1, wherein width in a sliding direction of the fixing part is set equal to or wider than stroke length between the first and second housing units.

3. The electronic apparatus of claim 1, wherein the slide module provides a spring part in which a compressed state changes according to a stroke position of the slider and fixing part between the slider and fixing part, and in case where the first housing unit and the second housing unit are moved to the longest stroke length, restoring force of the spring part are made to operate between the slider and the fixing part.

4. The electronic apparatus of claim 1, wherein the slider of the slide module is fixed to a recess formed on the opposed surface of the first housing unit, and the fixing part that supports the slider is fixed to a recess formed on the opposed surface of the second housing unit.

5. The electronic apparatus of claim 1, wherein the slider, the fixing part or both thereof is formed of a metal plate.

6. The electronic apparatus of claim 1, wherein a slide member is provided between the fixing part and the slider.

7. The electronic apparatus of claim 1, wherein the electronic apparatus is a portable device.

8. An electronic apparatus, comprising:
first and second housing units to be slid; and
a slide module that is disposed between opposed surfaces of the first housing unit and the second housing unit to slidably support the first and second housing units; wherein
the slide module has a slider fixed to the first housing unit and a fixing part fixed to the second housing unit to slidably support the slider,
guide width of the fixing part toward the slider is narrower than stroke length between the first and second housing units in case where the first housing unit and the second housing unit are in a closed state and a slide between the first housing unit and the second housing unit is at an end of a stroke between the first housing unit and the second housing unit, the guide width being length of an overlap between the fixing part and the slider, and
the guide width is equal to or wider than the stroke length in case where the first housing unit and the second housing unit are in an opened state and the slide is at another end of the stroke.

9. The electronic apparatus of claim 8, wherein width in a sliding direction of the fixing part is set equal to or wider than the stroke length.

10. The electronic apparatus of claim 8, wherein a slide guide face that guides a side part of the fixing part is provided for the first housing unit over relative movement of the first housing unit and the fixing part of the slide module.

11. The electronic apparatus of claim 10, wherein a slide member that contacts the slide guide face is provided for the fixing part.

12. The electronic apparatus of claim 8, wherein the slide module provides a spring part in which a compressed state changes according to a stroke position of the slider and fixing part between the slider and fixing part, and in case where the first housing unit and the second housing unit are moved to the longest stroke length, restoring force of the spring part are made to operate between the slider and the fixing part.

13. The electronic apparatus of claim 8, wherein the slider of the slide module is fixed to a recess formed on the opposed surface of the first housing unit, and the fixing part that supports the slider is fixed to a recess formed on the opposed surface of the second housing unit.

14. The electronic apparatus of claim 8, wherein the slider, the fixing part or both thereof is formed of a metal plate.

15. The electronic apparatus of claim 8, wherein a slide member is provided between the fixing part and the slider.

16. The electronic apparatus of claim 8, wherein the electronic apparatus is a portable device.

17. A sliding mechanism, comprising:
first and second housing units to be slid; and
a slide module that is disposed between opposed surfaces of the first housing unit and the second housing unit to slidably support the first and second housing units, wherein
the slide module has a slider fixed to the first housing unit and a fixing part fixed to the second housing unit to slidably support the slider,
the first housing unit provides slide guide faces that guide a side part of the fixing part over relative movement of the first housing unit and the fixing part of the slide module,
the slider is fixed to the first housing unit between the slide guide faces,
in case where the first housing unit and the second housing unit are slid to be an opened state, a position of an end of a stroke of the slider is set at an end part of the fixing part, and
end parts of the slider in a sliding direction are hidden so as not to protrude from the second housing unit.

18. A sliding mechanism, comprising:
first and second housing units to be slid; and
a slide module that is disposed between opposed surfaces of the first housing unit and the second housing unit to slidably support the first and second housing units; wherein
the slide module has a slider fixed to the first housing unit and a fixing part fixed to the second housing unit to slidably support the slider,
guide width of the fixing part toward the slider is narrower than stroke length between the first and second housing units in case where the first housing unit and the second housing unit are in a closed state and the first housing unit and the second housing unit are at an end of a stroke between the first housing unit and the second housing unit, the guide width being length of an overlap between the fixing part and the slider, and
the guide width is equal to or wider than the stroke length in case where the first housing unit and the second housing unit are in an opened state and are at another end of the stroke.

* * * * *